US012600419B2

(12) United States Patent (10) Patent No.: US 12,600,419 B2
Mastronardi et al. (45) Date of Patent: Apr. 14, 2026

(54) CONTROL STATION FOR COMPACT VEHICLES

(71) Applicant: JLG INDUSTRIES, INC., McConnellsburg, PA (US)

(72) Inventors: Shane J. Mastronardi, Hagerstown, MD (US); Ignacy Puszkiewicz, Hagerstown, MD (US); Zeno Poltronieri, Nogara (IT); Roberto Marchesini, Sanguinetto (IT); Matteo Lavagnini, Zevio (IT)

(73) Assignee: JLG Industries, Inc., McConnellsburg, PA (US)

( * ) Notice: Subject to any disclaimer, the term of this patent is extended or adjusted under 35 U.S.C. 154(b) by 484 days.

(21) Appl. No.: 18/116,324

(22) Filed: Mar. 2, 2023

(65) Prior Publication Data

US 2023/0202590 A1 Jun. 29, 2023

Related U.S. Application Data

(63) Continuation of application No. 16/839,396, filed on Apr. 3, 2020, now Pat. No. 11,597,452.

(Continued)

(51) Int. Cl.
 B62D 51/00 (2006.01)
 B60K 26/00 (2006.01)
 (Continued)

(52) U.S. Cl.
 CPC ............ B62D 51/001 (2013.01); B60K 26/00 (2013.01); B62D 51/007 (2013.01); B62D 51/02 (2013.01);
 (Continued)

(58) Field of Classification Search
 CPC .... B62D 51/001; B62D 51/007; B62D 51/02; B60K 26/00; B60K 2026/029;
 (Continued)

(56) References Cited

U.S. PATENT DOCUMENTS 4,275,800 A 6/1981 Batzel
4,436,177 A 3/1984 Elliston
 (Continued)

FOREIGN PATENT DOCUMENTS

CN 107074514 A 8/2017
CN 207096943 U 3/2018
 (Continued)

OTHER PUBLICATIONS

Chinese Office Action dated Nov. 10, 2022 issued in Chinese Patent Application No. 202080027188.2, 8 pp.
 (Continued)

*Primary Examiner* — Drew J Brown
(74) *Attorney, Agent, or Firm* — FOLEY & LARDNER LLP

(57) ABSTRACT

A vehicle control station includes a hand rest and at least one micro-joystick positioned relative to the hand rest such that the hand rest is configured to locate an operator's hand and fingers in position to operate the at least one micro-joystick. A function enable switch may be configured to activate the at least one micro-joystick.

18 Claims, 13 Drawing Sheets

Related U.S. Application Data

(60) Provisional application No. 62/829,123, filed on Apr. 4, 2019.

(51) Int. Cl.

| | | |
|---|---|---|
| *B60K 26/02* | (2006.01) | |
| *B62D 51/02* | (2006.01) | |
| *B66F 11/04* | (2006.01) | |

(52) U.S. Cl.
CPC ........ *B66F 11/04* (2013.01); *B60K 2026/029* (2013.01)

(58) Field of Classification Search
CPC .......... B66F 11/04; B66F 9/20; B66F 9/0759; G05G 5/005; G05G 9/047; G05G 1/01; E02F 9/2004
See application file for complete search history.

(56) References Cited

U.S. PATENT DOCUMENTS

| | | | |
|---|---|---|---|
| 4,702,520 | A | 10/1987 | Whisler |
| 4,730,691 | A | 3/1988 | Grigg |
| 5,086,869 | A | 2/1992 | Newbery et al. |
| 6,249,725 | B1 | 6/2001 | Dziedzioch et al. |
| 6,643,577 | B1 | 11/2003 | Padgett |
| 6,971,194 | B2 | 12/2005 | McClelland et al. |
| 7,032,703 | B2 | 4/2006 | Wulfert et al. |
| 7,188,991 | B1 | 3/2007 | Weiler |
| 7,484,587 | B2 | 2/2009 | Portscheller et al. |
| 7,641,021 | B2 | 1/2010 | Behncke et al. |
| 8,398,023 | B2 | 3/2013 | N nez et al. |
| 8,478,455 | B2 | 7/2013 | Orsulak et al. |
| 9,701,023 | B2 | 7/2017 | Zhang et al. |
| 9,970,176 | B2 * | 5/2018 | Azure .................... E02F 3/422 |
| 10,124,999 | B2 | 11/2018 | Puszkiewicz et al. |
| 10,126,733 | B2 | 11/2018 | Suzuki et al. |
| 10,262,465 | B2 | 4/2019 | Wright et al. |
| 10,488,862 | B2 | 11/2019 | Buburuzan et al. |
| 10,583,923 | B2 | 3/2020 | Alves et al. |
| 2008/0255704 | A1 | 10/2008 | Braut |
| 2013/0091971 | A1 * | 4/2013 | Helot ................. F16H 59/0217 74/473.3 |

FOREIGN PATENT DOCUMENTS

| | | | | |
|---|---|---|---|---|
| DE | 10 2004 052 757 | | 5/2006 | |
| EP | 3 440 526 | | 2/2019 | |
| FR | 3 008 503 | | 1/2015 | |
| JP | 2009012919 A | * | 1/2009 | |
| JP | 2010095327 A | * | 4/2010 | |
| KR | 10-1415499 | | 7/2014 | |
| WO | WO-2013141746 A1 | * | 9/2013 | ............. G05G 9/047 |
| WO | WO 2017/177113 | | 10/2017 | |

OTHER PUBLICATIONS

International Search Report dated Aug. 11, 2020 issued in PCT International Patent Application No. PCT/US2020/026559, 6 pp.

* cited by examiner

10

12

52, 54

62

64

56, 58

CONTROL STATION FOR COMPACT VEHICLES

CROSS-REFERENCES TO RELATED APPLICATIONS

This application is a continuation of U.S. patent application Ser. No. 16/839,396, filed Apr. 3, 2020, pending, which claims the benefit of U.S. Provisional Patent Application No. 62/829,123, filed Apr. 4, 2019, the entire content of each of which is herein incorporated by reference.

STATEMENT REGARDING FEDERALLY SPONSORED RESEARCH OR DEVELOPMENT (NOT APPLICABLE)

BACKGROUND

The invention relates to compact vehicles and, more particularly, to a control station that is particularly suited for stand-on tracked vehicles like dumpers, crawler work platforms (booms and scissors) as well as wheeled work platforms and other types of compact tracked and wheeled vehicles.

Existing track type machines or crawler machines with a stand-on control station typically use one of two approaches to control station design. With a single two-axis proportional joystick, the left and right vehicle tracks are driven proportionally based on a position of the single joystick. For example, pushing the joystick straight forward provides for equal drive to the left and right tracks, whereas pushing the joystick forward and 45° to the right, for example, would drive the left track slightly faster than the right track, causing the vehicle to initiate a right turn. The second approach utilizes two single-axis joysticks that are typically positioned close together. Each of the two single-axis joysticks independently controls one of the left and right tracks. Thus, for example, pushing the left joystick forward would drive the left track and initiate a right turn.

SUMMARY

The control station of the described embodiments provides improved control by incorporating a hand rest (grab), which allows the operator to stabilize his/her hand and control both tracks or wheel sets with one hand. Each track (crawler) assembly is controlled by a separate, proportional micro-joystick (controller); alternatively, left side wheels and right side wheels may be controlled independently (front only, back only, or both front and back) with each micro-joystick. A function enable switch may be incorporated into the hand rest assembly. The assembly can be attached or integrated into the control station. The joysticks may be provided with integrated color lights, and those colors can be coordinated with decals explaining operation of the control. The control station may also include both left and right side hand rests incorporating additional controls for the operator's opposite hand.

In an exemplary embodiment, a vehicle control station includes a first hand rest and at least one first micro-joystick positioned relative to the first hand rest such that the first hand rest is configured to locate an operator's hand and fingers in position to operate the at least one first micro-joystick. A first function enable switch is configured to activate the at least one first micro-joystick.

The first function enable switch may include a contactless sensor, such as a capacitance sensor. The switch may be incorporated into the hand rest. In some embodiments, the first hand rest includes a framework, and the contact-less sensor may be supported via the framework. The first function enable switch may alternatively be positioned relative to the first hand rest for operation by one of the operator's fingers different from those positioned to operate the at least one first micro-joystick, e.g., the operator's thumb.

The control station may include two first micro-joysticks positioned for operation by one hand. In this context, the first function enable switch may be positioned for operation by the one hand. The first hand rest may include a finger guard positioned between the two first micro-joysticks.

In some embodiments, the vehicle control station is configured for an application to a tracked vehicle including a left track and a right track, where the two first micro-joysticks are configured for independent operation of the left and right tracks, respectively.

The vehicle control station may additionally include a second hand rest and at least one second micro-joystick positioned relative to the second hand rest such that the second hand rest is configured to locate an operator's opposite hand and fingers in position to operate the at least one second micro-joystick. A second function enable switch is configured to activate the at least one second micro-joystick. A secondary switch may be positioned relative to the hand rest for operation by the operator's opposite hand, which may include one of an additional second micro-joystick, a press button, a two-position switch, and a single-axis micro-joystick.

In some embodiments, the vehicle control station is configured for an application to an aerial work platform including a platform supported on a boom or scissor mechanism, where the at least one first micro-joystick may be configured for vehicle drive, and the at least one second micro-joystick may be configured for manipulating the platform.

The at least one first micro-joystick may be positioned relative to the first hand rest such that a horizontal distance (A) from a forward edge of the first hand rest to a forward edge of the first micro-joystick is 0.0-0.65″, a vertical distance (B) from a top of the first hand rest to a center of the first micro-joystick is 1.50-2.25″, an orientation angle (C) of the first micro-joystick relative to horizontal is 5-10°, a vertical distance (D) from the forward edge of the first hand rest to the first micro-joystick is 0.30-0.75″, and a linear distance (E) from the first hand rest to a distal edge of the first micro-joystick is 0.30-1.30″.

In another exemplary embodiment, a vehicle control station includes a left side hand rest, a right side hand rest, a pair of first micro-joysticks cooperable with one of the left and right side hand rests, and at least one second micro-joystick cooperable with the other of the left and right side hand rests. The one of the left and right side hand rests is configured to enable an operator to operate the pair of first micro-joysticks with one hand. The other of the left and right side hand rests is configured to enable the operator to operate the at least one second micro-joystick with an opposite hand. First and second function enable switches are incorporated into each of the left and right side hand rests, respectively. The first and second function enable switches are configured to activate the pair of first micro-joysticks and the at least one second micro-joystick, respectively.

BRIEF DESCRIPTION OF THE DRAWINGS

These and other aspects and advantages will be described in detail with reference to the accompanying drawings, in which.

DETAILED DESCRIPTION

Figure 1:
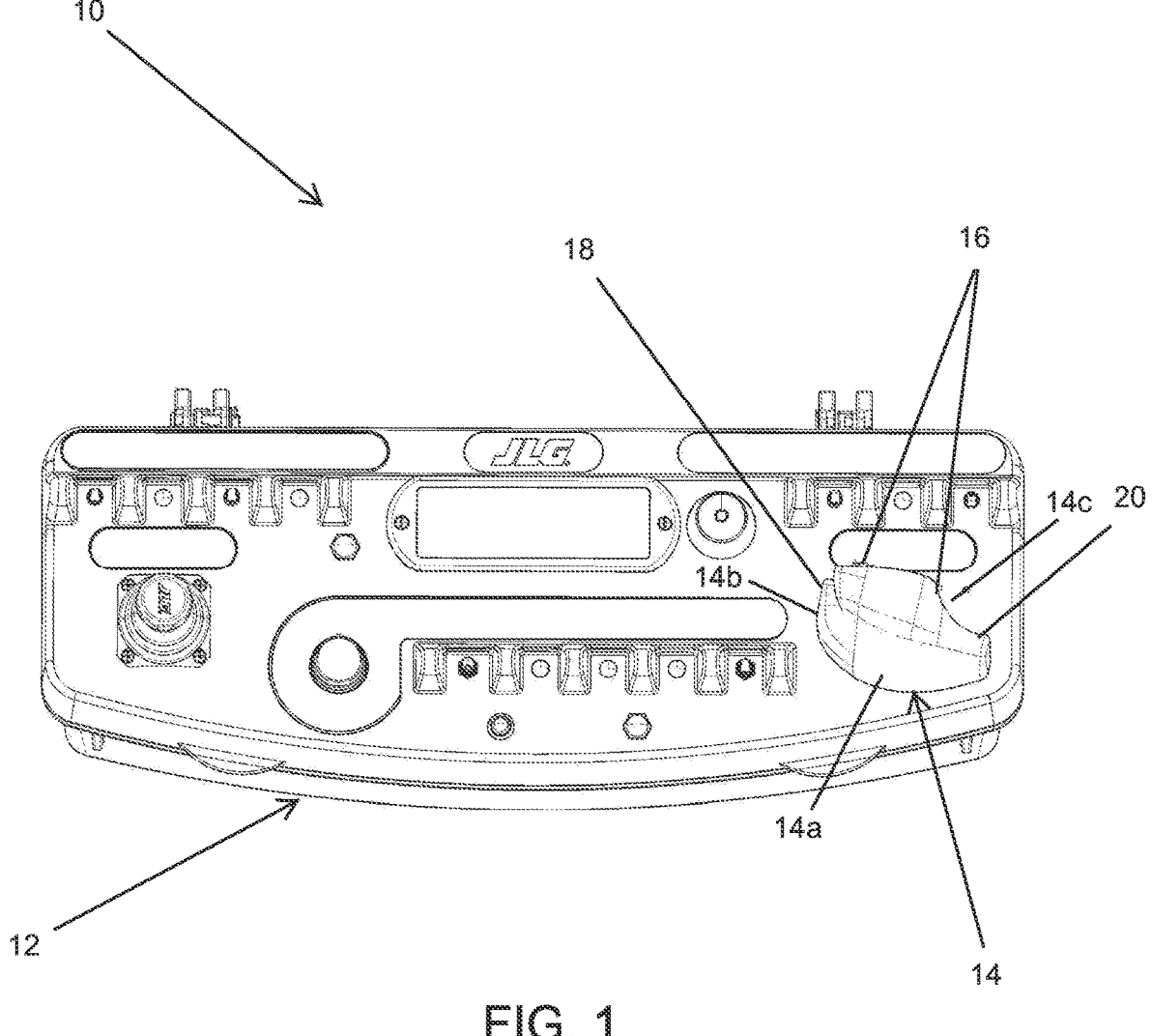
FIG. 1 shows a bolt-on version of a control station attached in place of a typical two-axis joystick.
Figure 3:
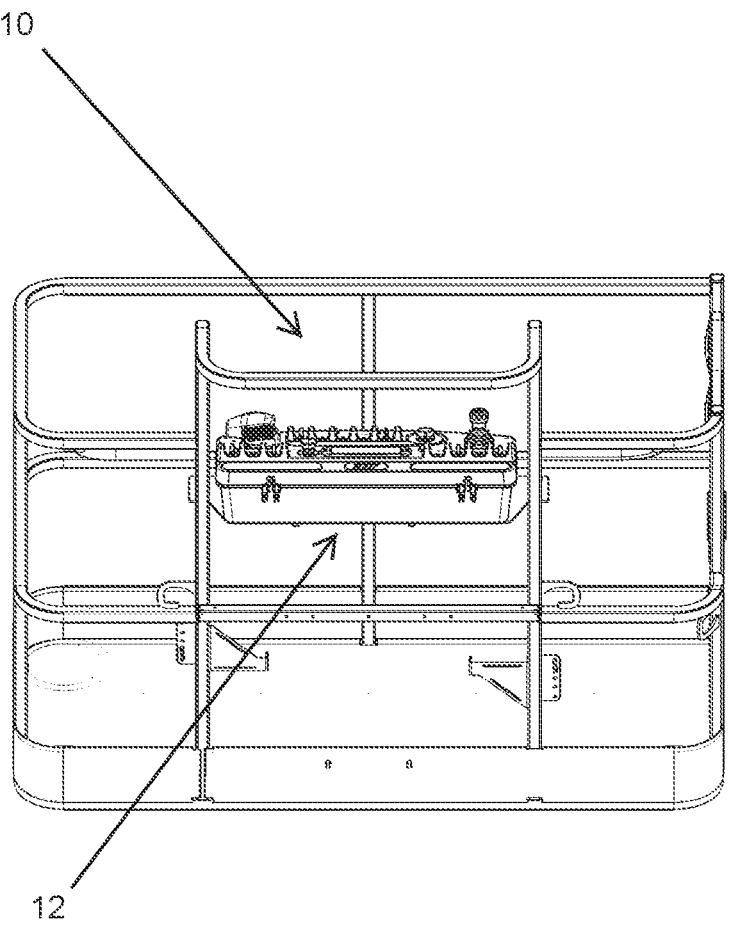
FIG. 3 shows a platform including an exemplary control station of the described embodiments.

FIG. 1 shows an exemplary bolt-on control accessory or hand rest assembly 10 attached to a machine control box 12. FIG. 3 shows the assembly 10 secured on a work platform. The hand rest assembly 10 replaces the typical single two-axis proportional joystick or the typical two single-axis joysticks for separately controlling the vehicle tracks. The control accessory 10 includes a hand rest 14 that serves to locate an operator's hand and fingers in position to operate separate proportional micro-joysticks 16. The hand rest 14 includes a forward surface 14*a*, a side surface 14*b*, and a back surface 14*c*. A function enable switch 18 is incorporated into the hand rest assembly 10 and is positioned for activation by the operator's thumb (for example, positioned on the side surface 14*b*). The function enable switch may alternatively be a contact-less sensor, such as a capacitance sensor. The hand rest assembly 10 may also include a flange 20 or the like to support and contain an outside portion of the operator's hand.

Figure 2:
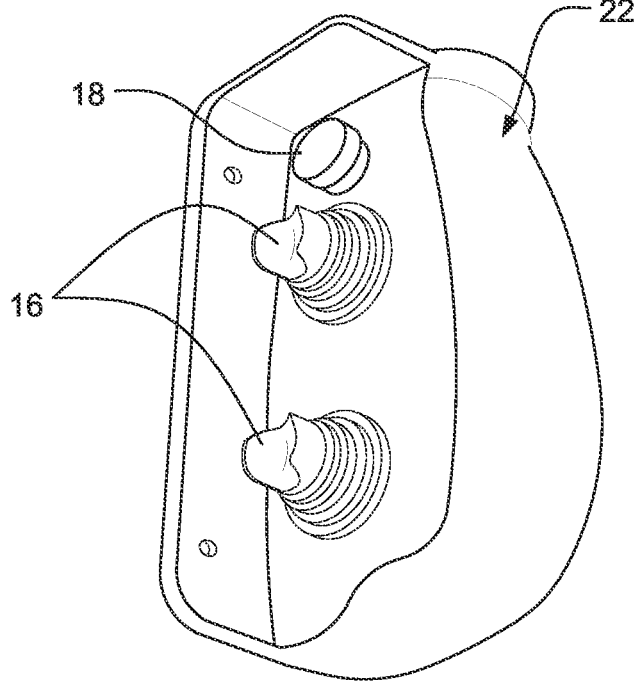
FIG. 2 shows an exemplary configuration of a control housing securable to the operator console.

FIG. 2 shows a variation including a housing 22 that may be bolted to the operator console. The housing 22 defines a hand rest and includes the micro-joystick controllers 16 and function enable switch 18. The operator can drive the machine with a single hand by manipulating the joysticks 16 with his/her fingers. In an exemplary application, pushing the joysticks 16 forward and down drive each respective track forward, whereas pulling the joysticks 16 aft and slightly up drive the respective tracks in reverse. The tracks are independently controlled with each of the joysticks 16. FIG. 3 shows a platform including an exemplary control station.

Figure 4:
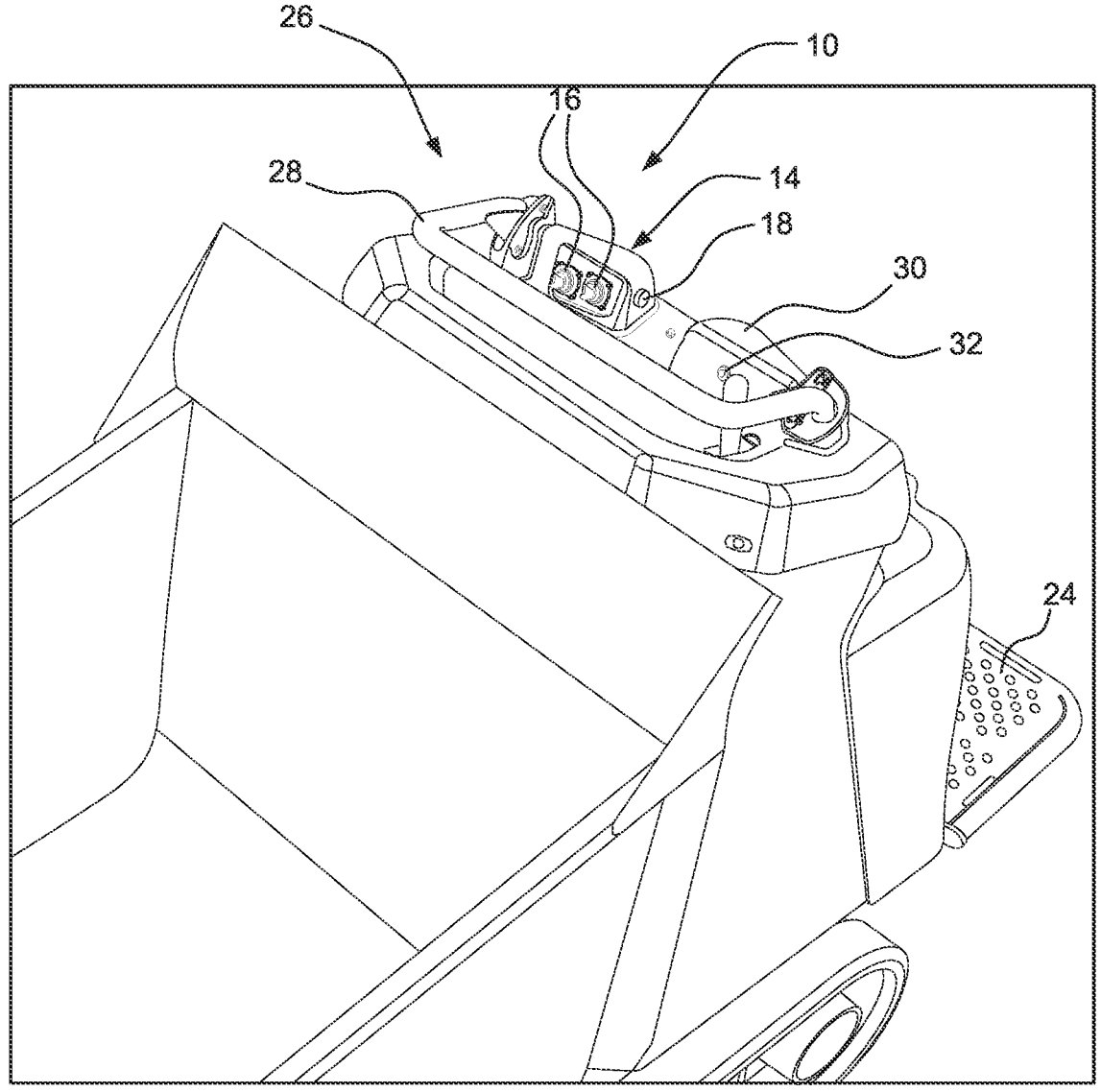
FIG. 4 shows an exemplary application on a stand-on tracked dumper vehicle.
Figure 5:
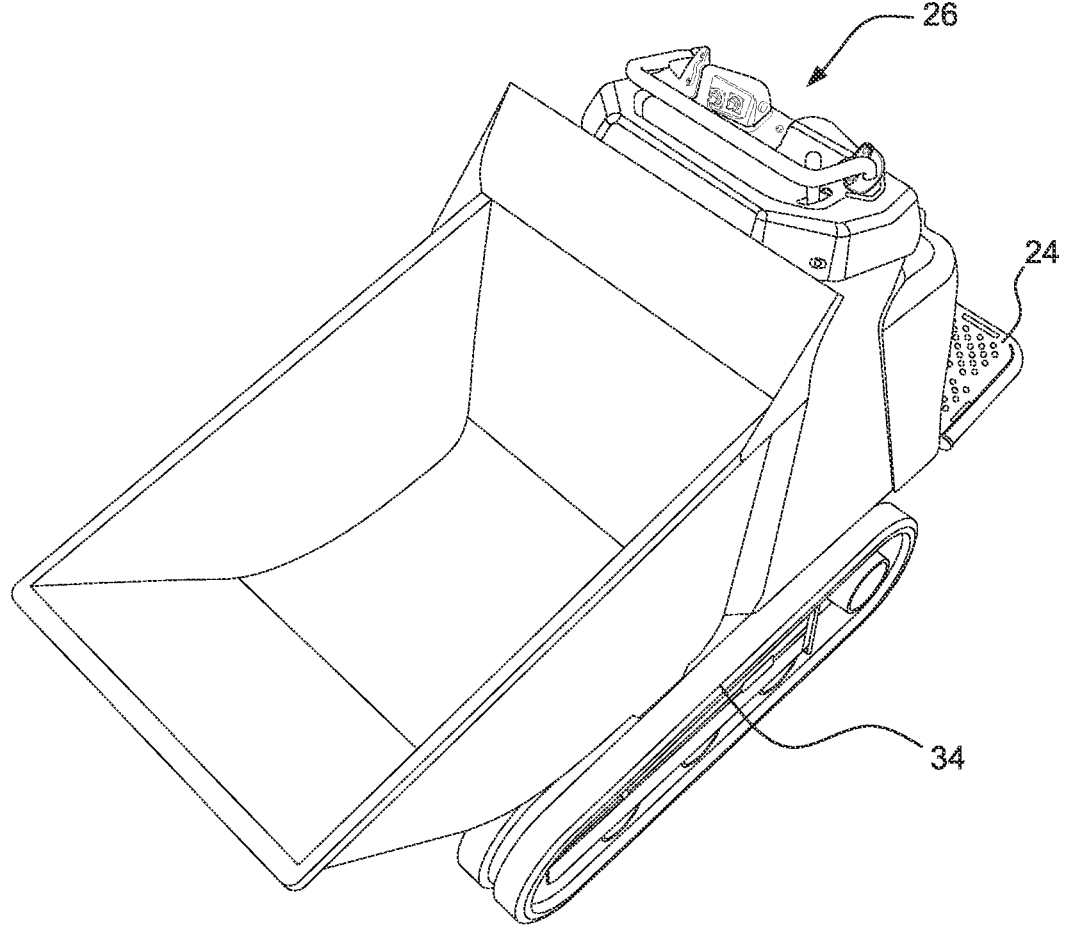
FIGS. 5 and 6 show alternative views of the exemplary tracked dumper vehicle.
Figure 6:
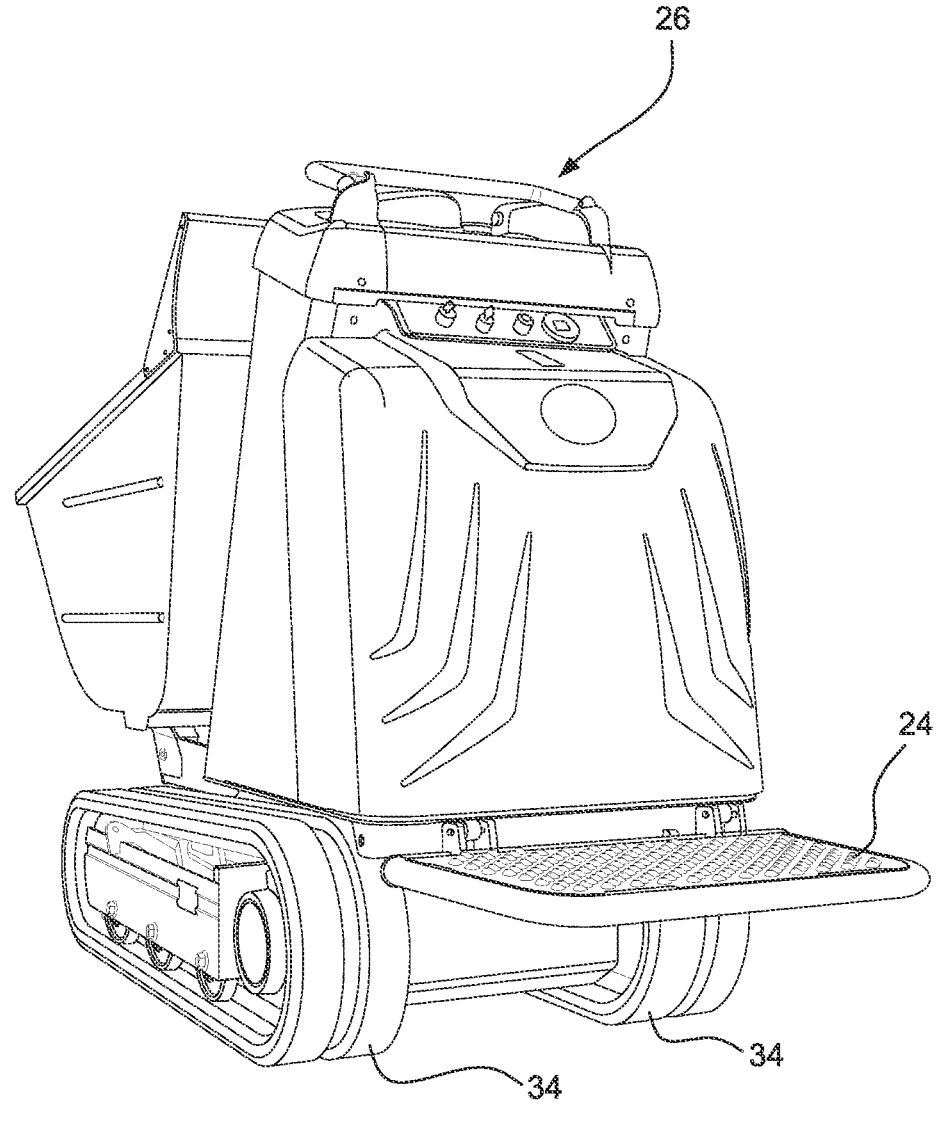

FIGS. 4-6 show an exemplary stand-on tracked dumper incorporating the hand rest assembly 10 of the described embodiments. The dumper vehicle includes an operator platform 24 and a control panel area 26 including the hand rest assembly 10. A safety bar 28 helps to prevent inadvertent operation of the control implements. The joysticks 16 and function enable switch 18 are positioned for manipulation by an operator's right hand. A matching hand rest 30 for the operator's left hand may incorporate controls for other functions. A single control switch 32 on the matching hand rest 30 is shown in FIG. 4. An exemplary control may be, for example, horn control. FIGS. 5 and 6 show the independent tracks 34 that drive the vehicle. In a variation, the function enable switch 18 may be associated with the opposite hand control (instead of or in addition to the horn control) or alternatively via a conventional foot-switch. Systems for driving the tracks 34 independently by operation of the micro-joysticks 16 are known, and details will not be further described.

Figure 7:
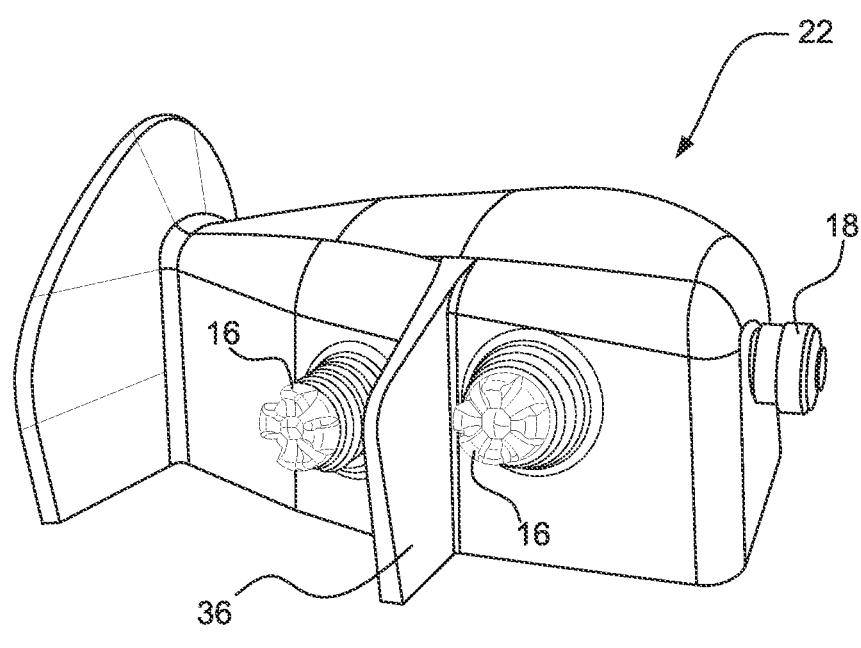
FIGS. 7 and 8 show the control housing including a divider or finger guard.
Figure 8:
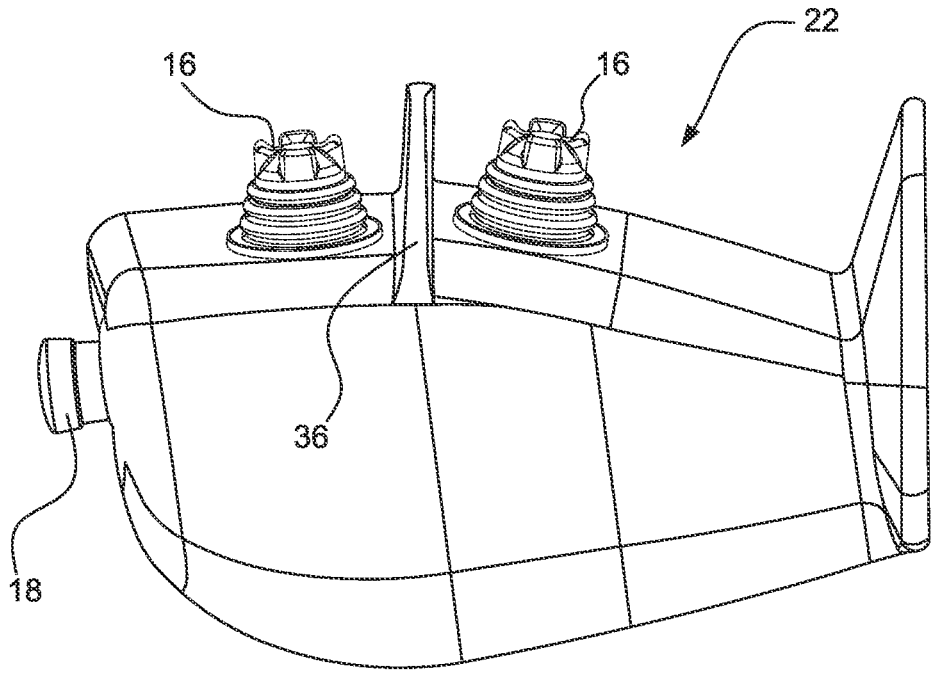

FIGS. 7 and 8 show a variation of the housing 22 including a divider or finger guard 36 that separates the micro-joysticks 16. The divider 36 helps to reduce or eliminates the possibility of accidental, unintended activation of the closely spaced micro-joysticks 16. The enable switch 18 is positioned for operation by the operator's thumb.

Figure 9:
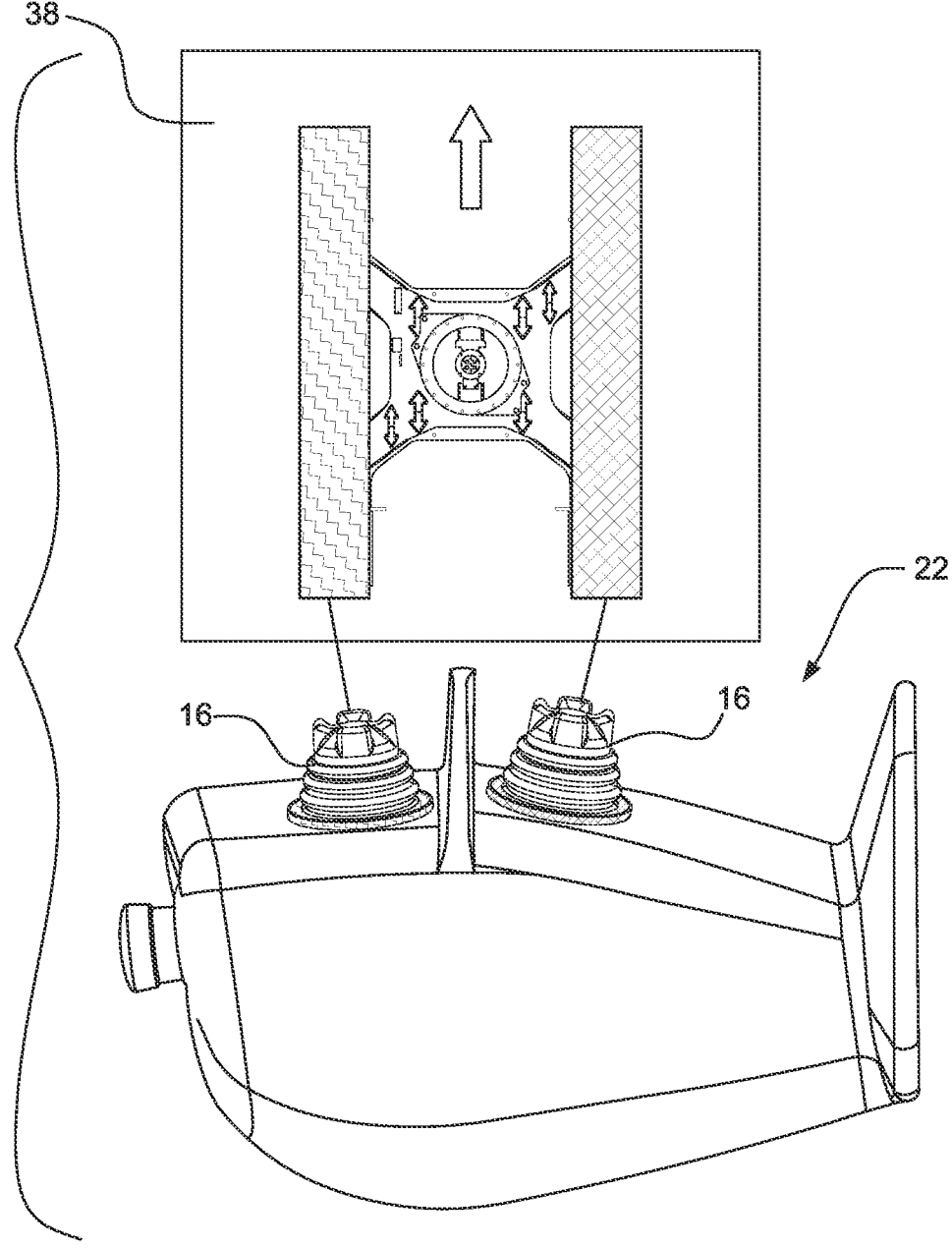
FIG. 9 shows an LED light built into the micro-joystick and a decal explaining operation.

FIG. 9 shows color coordination between an LED light built into the micro-joysticks 16 and a decal 38 explaining operation of the controller.

Figure 10:
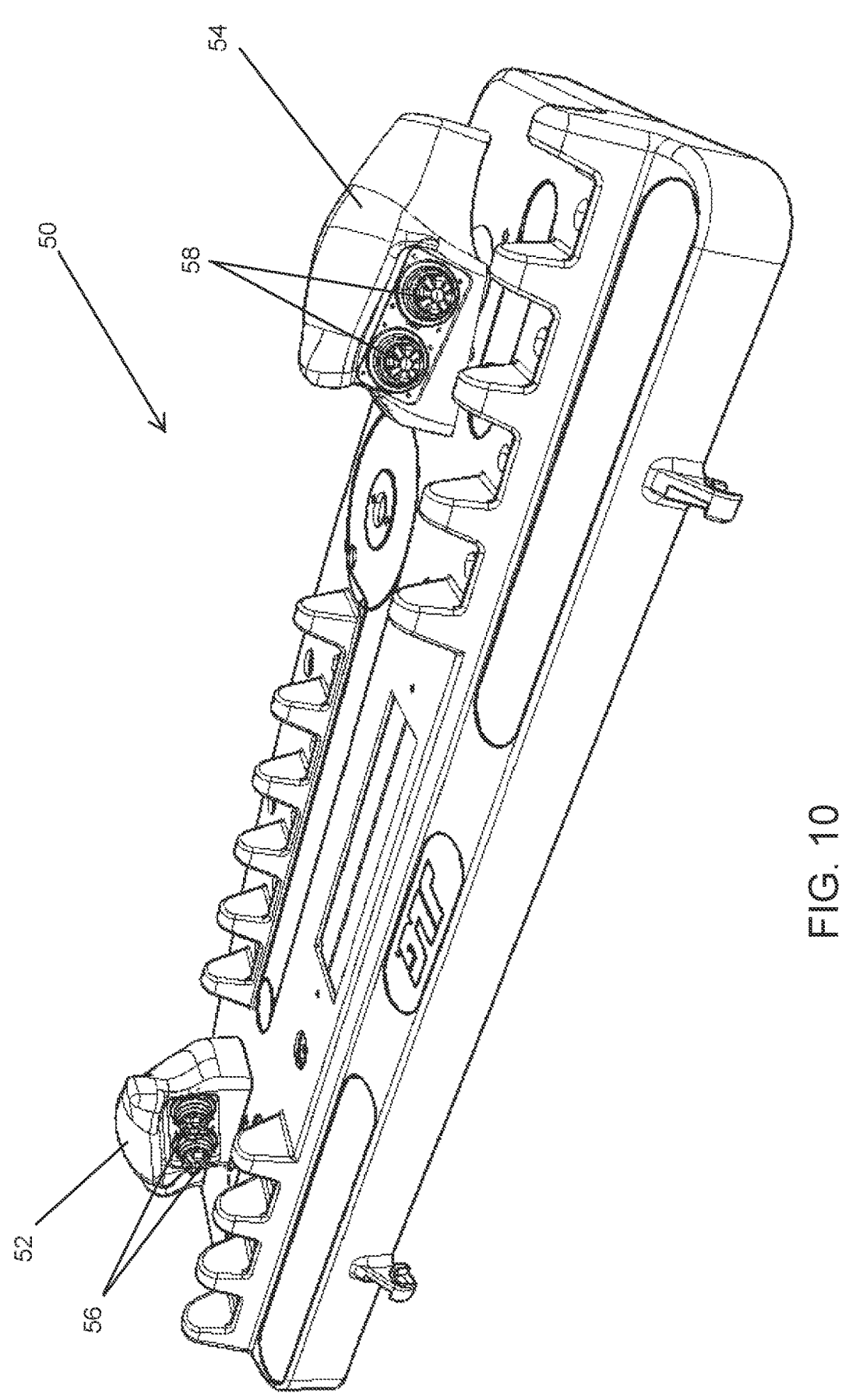
FIG. 10 shows an exemplary control station of an alternative embodiment incorporating left and right side hand rests with micro-joystick-controllers.
Figure 11:
FIG. 11 shows a variation of the FIG. 10 embodiment.
Figure 12:
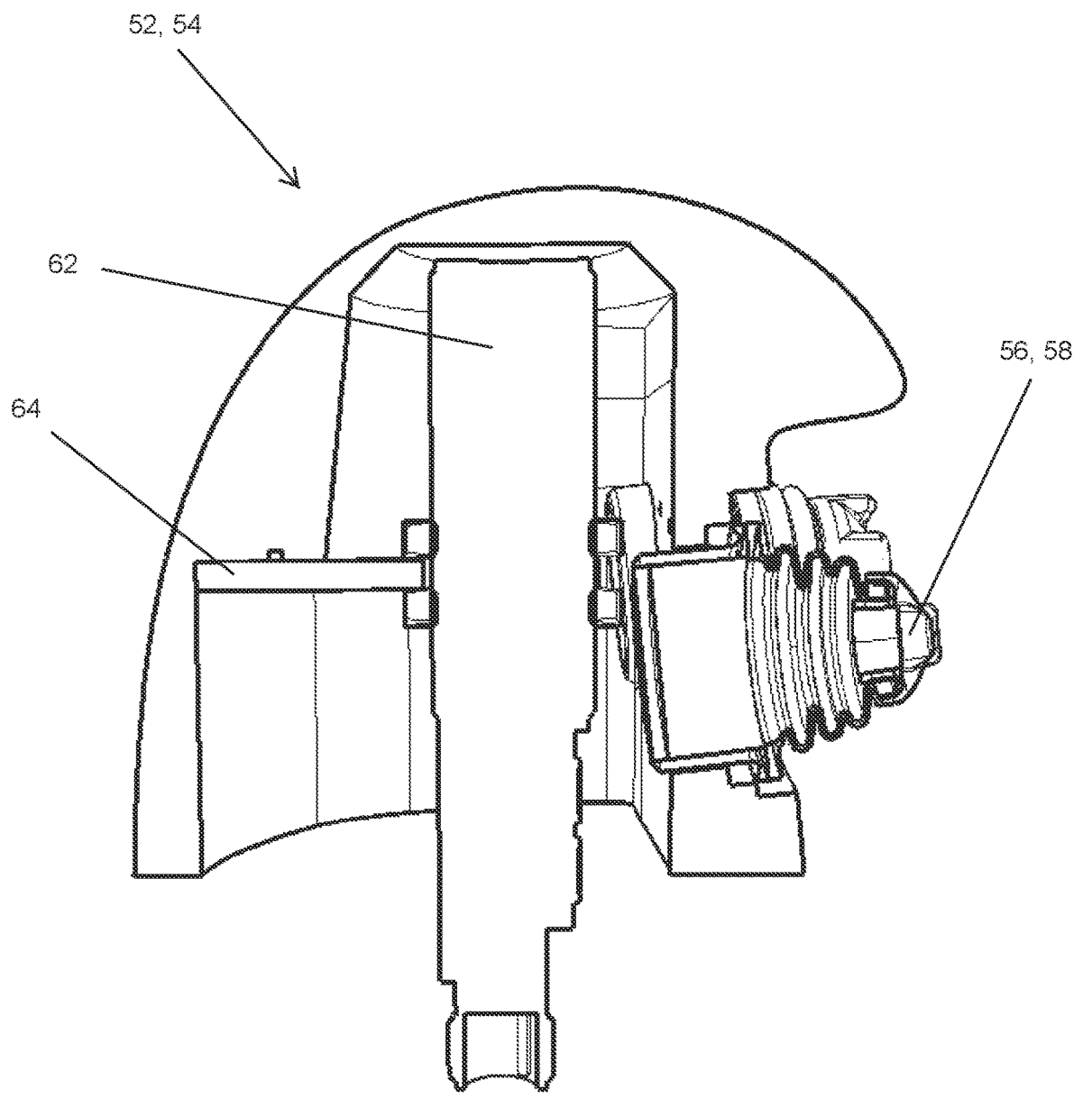
FIG. 12 is a cross-sectional view through the hand rest and micro-joystick assembly.

FIGS. 10-12 show an alternative configuration for a vehicle control station 50. Like the first embodiment, the vehicle control station 50 is cooperable with a machine control box for controlling machine function and operation.

The control station 50 includes a first or right side hand rest 52 and a second or left side hand rest 54. The hand rests 52, 54 may also be switched. The right side hand rest 52 shown in FIG. 10 includes a pair of first micro-joysticks 56. The hand rest 52 is configured to enable an operator to operate the pair of first micro-joysticks 56 with one hand.

The left side hand rest 54 shown in FIG. 10 includes a pair of second micro-joysticks 58, and the hand rest 54 is configured to enable the operator to operate the second micro-joysticks 58 with an opposite hand.

In FIG. 11, one of the second micro-joysticks 58 is replaced with an alternative switch 60 such as a press button, a two-position switch or the like. In an exemplary construction, where the right side hand rest 52 and first micro-joysticks 56 are intended for vehicle drive, the left side hand rest 54 and second micro-joysticks 58 and/or switch 60 are provided for alternative functions. Exemplary functions may include platform manipulation with an application to an aerial work platform that includes a platform supported on a boom or scissor mechanism. The switch 60 may be functional for horn operation, or as a two-position switch or single-axis micro-joystick for telescope in/out, etc.

FIG. 12 is a cross-sectional view through the hand rests 52, 54 and micro-joysticks 56, 58. Each of the hand rests 52, 54 includes a function enable switch 62 that is configured to activate the micro-joysticks 56, 58 and/or switch 60 in use. The function enable switches 62 may be in the form of a physical switch as shown in the first embodiment positioned for operation by an operator's thumb. Alternatively, the function enable switches may be contact-less sensors such as a capacitance sensor or the like. In the exemplary embodiment shown in FIG. 12, a contact-less sensor 62 is embedded within the hand rests 52, 54 and supported via a framework 64. Any suitable contact-less sensor could be used, and there are several known sensors of this type.

Figure 13:
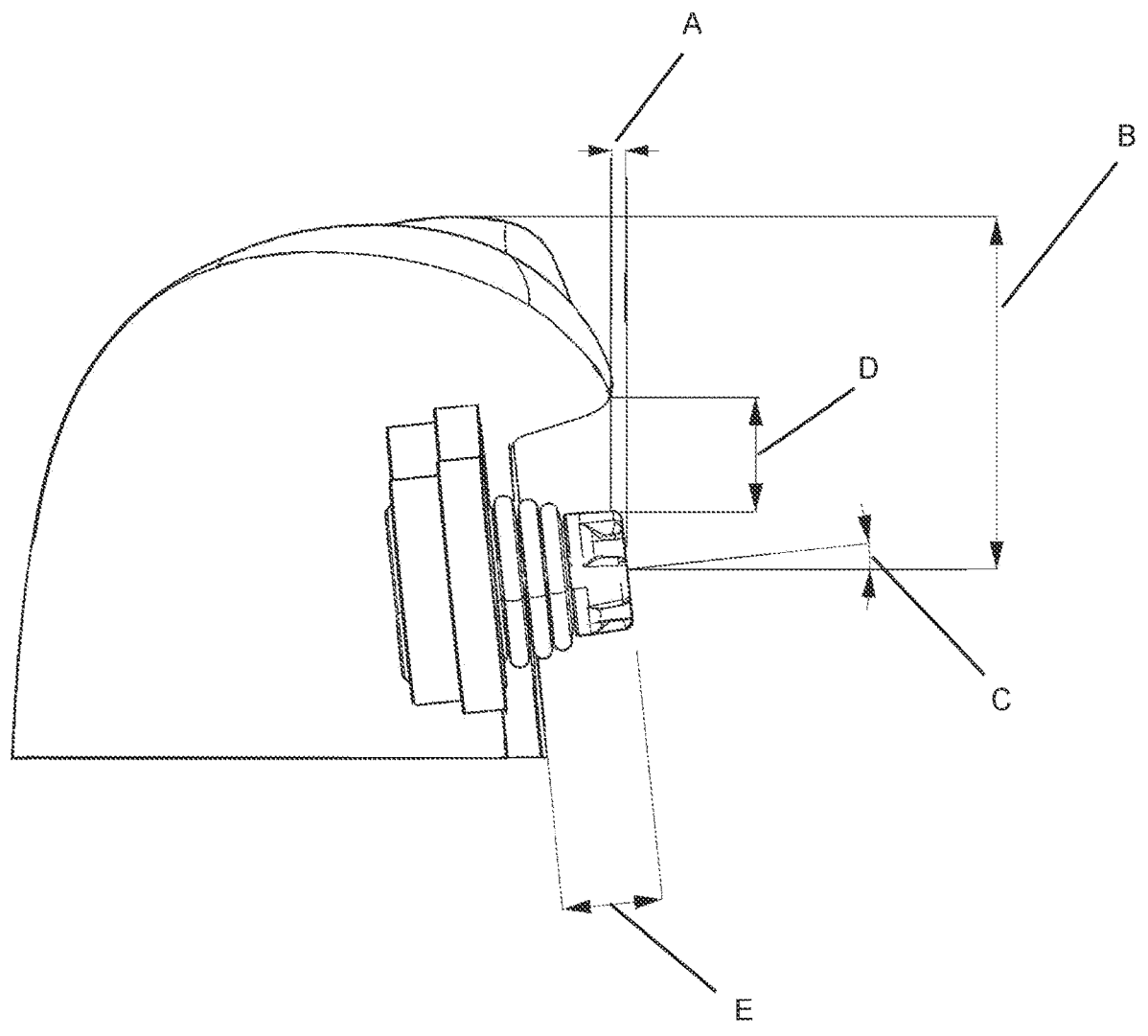
FIG. 13 is a cross-sectional view through the hand rest showing exemplary relationships between the hand grip and the position and orientation of the mini-joystick.

FIG. 13 illustrates ergonomic dimensions that result in a proper relationship between the hand grip and the position and orientation of the mini-joystick. The dimensions are the result of research and investigation to assure comfortable ergonomic operation. Any or all of the hand grips as shown and described may be configured for comfortable ergonomic operation. For example, with reference to FIG. 13, the micro-joystick(s) may be positioned relative to the hand rests such that a horizontal distance (A) from a forward edge of the hand rest to a forward edge of the micro-joystick is 0.0-0.65", a vertical distance (B) from a top of the hand rest to a center of the micro-joystick is 1.50-2.25", an orientation angle (C) of the micro-joystick relative to horizontal is 5-10°, a vertical distance (D) from the forward edge of the hand rest to the micro-joystick is 0.30-0.75", and a linear distance (E) from the hand rest to a distal edge of the micro-joystick (i.e., a "height" of the micro-joystick) is 0.30-1.30".

Figure 14:
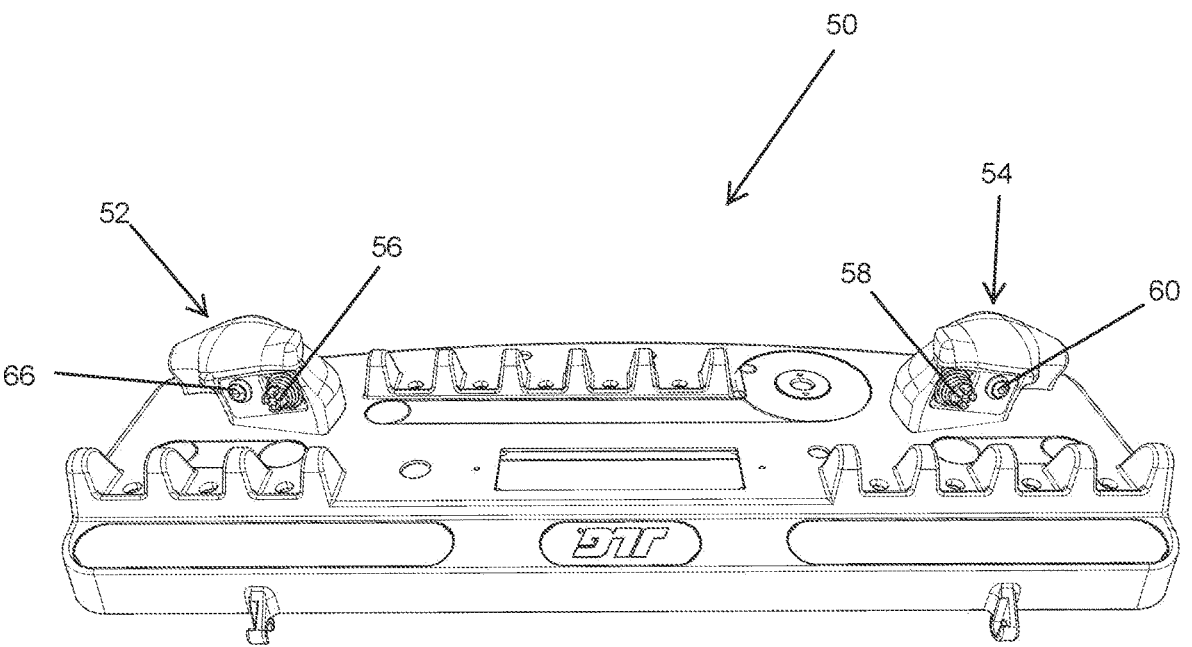
FIG. 14 shows an exemplary control station of an alternative embodiment suited for controlling a wheeled machine.

FIG. 14 illustrates the control station 50 further modified for control of a wheeled machine. In FIG. 14, the right side hand rest 52 includes a dual axis micro-joystick 56 and an alternative switch 66 such as a press button, a two-position switch or a single-axis micro-joystick. Similarly, the left side hand rest 54 includes a dual axis micro-joystick 58 and an alternative switch 60. In an exemplary application, one of the dual axis micro-joysticks 56, 58 can be used to control drive speed and direction with UP/DOWN displacement and steer with LEFT/RIGHT displacement.

The hand rest assembly 10, the housing 22 and hand rests 52, 54 are applicable and interchangeable with one another as each variation and feature may be included any of the other components. For example, the hand rest assembly 10 and the hand rests 52, 54 may be provided with the divider 36 shown with the housing 22.

The control station of the described embodiments provides an innovative approach to control vehicle drive and functionality, while allowing the operator to maintain stability while controlling driving function with a single hand. The function enable switches serve to prevent inadvertent operation. The control station is particularly applicable to tracked vehicles, crawler work platforms (booms and scissors) and other types of compact vehicles. The system is also applicable to control wheeled machines with stand-on operation stations, particularly work platforms (booms and scissors).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A vehicle control station comprising:
a left side hand rest;
a right side hand rest;
a pair of first micro-joysticks cooperable with one of the left and right side hand rests, wherein the one of the left and right side hand rests is configured to enable an operator to operate the pair of first micro-joysticks with one hand;
at least one second micro-joystick cooperable with the other of the left and right side hand rests, wherein the other of the left and right side hand rests is configured to enable the operator to operate the at least one second micro-joystick with an opposite hand; and
first and second function enable switches incorporated into each of the left and right side hand rests, respectively, the first and second function enable switches being configured to activate the pair of first micro-joysticks and the at least one second micro-joystick, respectively,
wherein at least one of the left and right side hand rests includes a forward surface, a side surface, and a back surface opposite the forward surface,
wherein the corresponding one of the pair of first micro-joysticks or the at least one second micro-joystick is at least partially enclosed by the back surface of the at least one of the left and right side hand rests extending at least partially over the corresponding one of the pair of first micro-joysticks or the at least one second micro-joystick.

2. A vehicle control station according to claim 1, wherein the first and second function enable switches comprise contact-less sensors.

3. A vehicle control station according to claim 1, configured for an application to a tracked vehicle including a left track and a right track, wherein the pair of first micro-joysticks are configured for independent operation of the left and right tracks, respectively.

4. A vehicle control station comprising:
a hand rest including a grab portion, a forward surface, a side surface, and a back surface opposite the forward surface; and
a micro-joystick controller positioned relative to the hand rest such that the hand rest and micro-joystick controller are configured to locate an operator's hand and fingers in position to operate the micro-joystick controller with one hand while grasping the grab portion with the one hand, wherein the micro-joystick controller is at least partially enclosed by the back surface of the hand rest extending at least partially over the micro-joystick controller.

5. A vehicle control station according to claim 4, further comprising a function enable switch positioned relative to the hand rest for operation by the one hand.

6. A vehicle control station according to claim 5, wherein the function enable switch is positioned relative to the hand rest for operation by the operator's thumb.

7. A vehicle control station according to claim 4, wherein the hand rest comprises a flange that is configured to support and contain an outside portion of the operator's hand.

8. A vehicle control station according to claim 4, comprising two micro-joystick controllers, wherein the two micro-joystick controllers are positioned relative to the hand rest such that the hand rest and the micro-joystick controllers are configured to locate the operator's hand and fingers in position to operate the two micro-joystick controllers with the one hand.

9. A vehicle control station according to claim 8, wherein the two micro-joystick controllers are displaceable forward and aft.

10. A vehicle control station according to claim 8, further comprising a divider or finger guard positioned between the two micro-joystick controllers.

11. A vehicle control station according to claim 4, wherein the micro-joystick controller is positioned relative to the hand rest such that a vertical distance (B) from a top of the hand rest to a center of the micro-joystick controller is 1.50-2.25".

12. A vehicle control station according to claim 4, wherein the micro-joystick controller is positioned relative to the hand rest such that a vertical distance (D) from a forward edge of the hand rest to the micro-joystick controller is 0.30-0.75".

13. A vehicle control station comprising:

a left side hand rest including a first grab portion;

a right side hand rest including a second grab portion;

a first micro-joystick controller positioned relative to the left side hand rest such that the left side hand rest and first micro-joystick controller are configured to locate an operator's hand and fingers in position to operate the first micro-joystick controller with one hand while grasping the first grab portion with the one hand; and a second micro-joystick controller positioned relative to the right side hand rest such that the right side hand rest and second micro-joystick controller are configured to locate an operator's opposite hand and fingers in position to operate the second micro-joystick controller with the opposite hand while grasping the second grab portion with the opposite hand, wherein at least one of the left side hand rest or the right side hand rest includes a forward surface, a side surface, and a back surface opposite the forward surface, wherein the corresponding one of the first micro-joystick controller or the second micro-joystick controller is at least partially enclosed by the back surface of the at least one of the left side hand rest or the right side hand rest extending at least partially over the corresponding one of the first micro-joystick controller or the second micro-joystick controller.

14. A vehicle control station according to claim 13, comprising a pair of the first micro-joystick controllers positioned relative to the left side hand rest such that the left side hand rest and first micro-joystick controllers are configured to locate the operator's hand and fingers in position to operate the first micro-joystick controllers with the one hand while grasping the first grab portion with the one hand.

15. A vehicle control station according to claim 13, comprising a pair of the second micro-joystick controllers positioned relative to the right side hand rest such that the right side hand rest and second micro-joystick controllers are configured to locate the operator's opposite hand and fingers in position to operate the second micro-joystick controllers with the opposite hand while grasping the second grab portion with the opposite hand.

16. A vehicle control station according to claim 13, further comprising at least one alternative switch positioned relative to the left side hand rest or the right side hand rest such that the at least one alternative switch is operable with the one hand or the opposite hand while grasping the first or second grab portion with the one hand or the opposite hand, respectively.

17. A vehicle control station according to claim 16, wherein the at least one alternative switch comprises at least one of a press button and a two-position switch.

18. A vehicle control station according to claim 13, further comprising:

a first alternative switch positioned relative to the left side hand rest such that the left side hand rest and first alternative switch are configured to locate the operator's hand and fingers in position to operate the first alternative switch with the one hand while grasping the first grab portion with the one hand; and a second alternative switch positioned relative to the right side hand rest such that the right side hand rest and second alternative switch are configured to locate the operator's opposite hand and fingers in position to operate the second alternative switch with the opposite hand while grasping the second grab portion with the opposite hand.

\* \* \* \* \*